United States Patent [19]
Fukunaga

[11] Patent Number: 5,875,770
[45] Date of Patent: Mar. 2, 1999

[54] METHOD OF CUTTING SEMICONDUCTOR INGOTS AND APPARATUS FOR CUTTING THEREOF

[75] Inventor: Hisaya Fukunaga, Kanagawa, Japan

[73] Assignee: Komatsu Electronic Metals Co., Ltd., Kanagawa, Japan

[21] Appl. No.: 903,725

[22] Filed: Jul. 31, 1997

[51] Int. Cl.⁶ ............................................. B28D 1/08
[52] U.S. Cl. ............................ 125/16.02; 125/21
[58] Field of Search .......................... 451/9, 10, 11, 451/41, 45; 125/16.02, 21, 16.01

[56] References Cited

U.S. PATENT DOCUMENTS

| | | | |
|---|---|---|---|
| 5,616,065 | 4/1997 | Egglhuber | 125/16.02 |
| 5,628,301 | 5/1997 | Katamachi | 125/21 |
| 5,699,782 | 12/1997 | Toyama | 125/16.02 |
| 5,715,806 | 2/1998 | Tonegawa et al. | 125/16.02 |
| 5,715,807 | 2/1998 | Toyama et al. | 125/16.02 |

*Primary Examiner*—Eileen P. Morgan
*Attorney, Agent, or Firm*—Sughrue, Mion, Zinn, Macpeak & Seas, PLLC

[57] ABSTRACT

The present invention proposes a method for cutting semiconductor ingots into sliced wafers by use of wire saws, so that the cut-out surface shape of wafers can be easily controlled by utilizing a wire-saw cutting device.

The workpiece holding plate 21 is disposed in such a way that it can move along the longitudinal axis Y of the semiconductor ingot 3. The semiconductor ingot 3 is moved downward to facilitate the cutting operation by wire saw. Accordingly, the displacement along the longitudinal axis Y is made to change in response to the variation along the location of the semiconductor ingot 3.

6 Claims, 4 Drawing Sheets

METHOD OF CUTTING SEMICONDUCTOR INGOTS AND APPARATUS FOR CUTTING THEREOF

BACKGROUND OF THE INVENTION

1. Field of the Invention

The present invention relates to a method and an apparatus for cutting semiconductor ingots into sliced wafers by using wire saws.

2. Description of Prior Art

Conventionally, semiconductor wafers are obtained by cutting them out from semiconductor ingots one by one, by an Internal Diameter saw(I.D.Saw). However, in the above mentioned cutting operation performed by I.D.Saw warps on each cut-out surface are formed because of the resistance incurred between the cut-out surface and the I.D.Saw. And, the size of each warp on every wafer is quite different from the others, and the distribution of the warps is broad.

To solve the above defects, proposals such as those disclosed in unexamined Japanese Publication TOKU KAI HEI 1-1820011 and 5-16943 are offered, in which I.D.Saws are controlled by certain measures to enhance the flatness of the cut-out surfaces of the wafers.

However, for the purpose of performing the cutting operation by using the blades of an I.D.Saw in the above mentioned methods, a detection device for detecting the deflection of the internal peripheral cutter after each cut-out of wafers, and control means for controlling the deflection of the internal peripheral cutter during cutting operation are required. Therefore, the structure and the operation of the device become complicated and the cutting device becomes bulky.

SUMMARY OF THE INVENTION

In light of the above described drawbacks, the object of the present invention is to provide a method for cutting semiconductor ingots. In the method according to this invention, a semiconductor ingot cutting device provided with popular wire saws is used to facilitate the control of the cut-out surfaces.

To achieve the above object, according to this invention, in the method for cutting a semiconductor ingot into sliced wafers by wire saws, the semiconductor ingot is disposed in such a way that it can move along its longitudinal axis, and the displacement along the longitudinal axis is controlled in response to the shifting of the cut-out location of the semiconductor ingot.

According to the present invention, a method of cutting a semiconductor ingot into sliced wafers by use of wire saws, comprises steps of: disposing the semiconductor ingot at a cutting position to be able to move along its longitudinal axis; and cutting the semiconductor ingot into sliced wafers while controlling the displacement along its longitudinal axis in response to the shifting of the cut-out location of the semiconductor ingot.

Preferably the method further comprises steps of: detecting a curve of warp values of wafers before cutting; and disposing the semiconductor ingot while controlling the preset displacement along the longitudinal axis of the semiconductor ingot so as to cancel out the warp values of wafers.

Preferably the method further comprises steps of: detecting a curve of warp values of wafers before cutting; and disposing the semiconductor ingot while presetting the displacement along the longitudinal axis of the semiconductor ingot so as to add the warp values to produce wafers with uniformly curved cross sections.

According to this invention, an apparatus for cutting a semiconductor ingot into sliced wafers by use of wire saws, comprises: wire saws; a fixing plate for disposing the semiconductor ingot at a cutting position to be able to move along its longitudinal axis; a detector for detecting a curve of warp values of wafers to be cut; and a means for controlling a disposing state of the semiconductor ingot to be cut on the fixing plate so as to control the displacement along its longitudinal axis in response to the shifting of the cut-out location of the semiconductor ingot.

Preferably in the apparatus for cutting a semiconductor ingot, the means for controlling controls the semiconductor ingot while controlling the preset displacement along the longitudinal axis of the semiconductor ingot so as to cancel out the warp values of wafers.

Preferably in the apparatus for cutting a semiconductor ingot, the means for controlling controls the semiconductor ingot while controlling the preset displacement along the longitudinal axis of the semiconductor ingot so as to add the warp values to produce wafers with uniformly curved cross sections.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

For easy comprehension, in the beginning, a cutting device provided with wire saws is simply explained.

Figure 6:
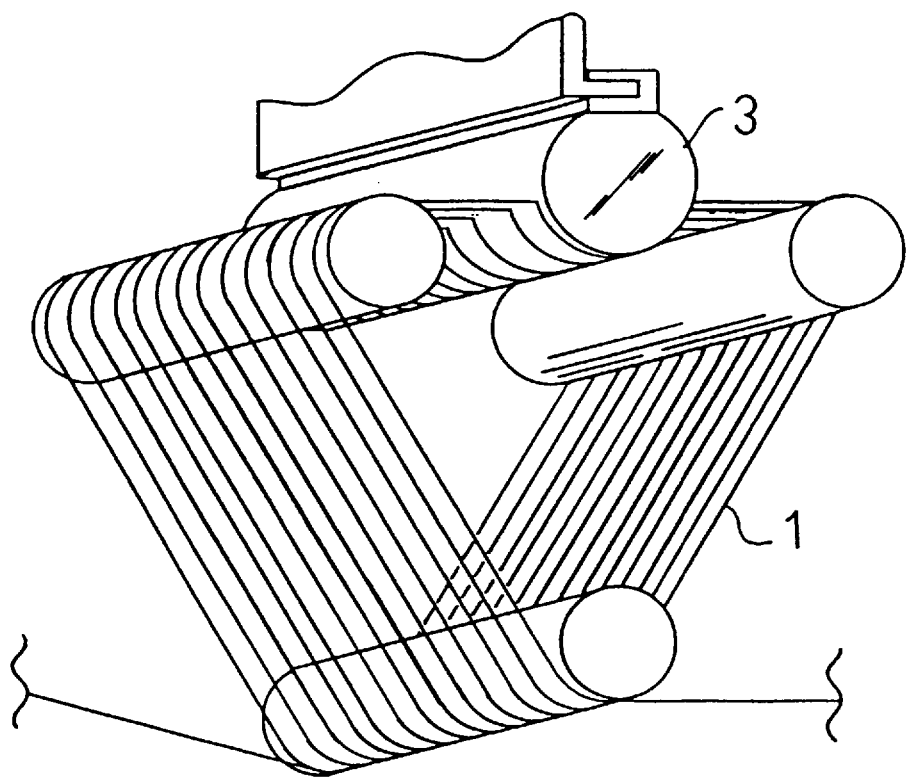
FIG. 6 is a schematic view showing the semiconductor ingot cutting device provided with wire saws, according to this invention.

The major characteristic of the cutting device resides in that it can cut out a number of wafers at one time with unchanging thickness, and the working time required for cutting operation can thus be intensely shortened (see FIG. 6).

Furthermore, comparing wafers obtained by conventional I.D.Saw with those obtained by wire saws, the major advantage of the present invention is that the shapes of the cut-out surfaces of wafers obtained by wire saws from one same semiconductor ingot are uniform and the distribution of the warps is very narrow.

By making use of the shape stability and the narrowness of the distribution of the warps for cut-out surfaces of wafers obtained by wire saws, instead of controlling the shifting of wire saws, this invention moves the semiconductor ingot to be cut along its longitudinal axis and controls the displacement of the semiconductor ingot so as to acquire at one time numerous wafers whose cut-out surfaces have flatness and whose thickness are uniform. The followings are descriptions of embodiments according to this invention, with reference to the drawings.

FIRST EMBODIMENT

Figure 1:
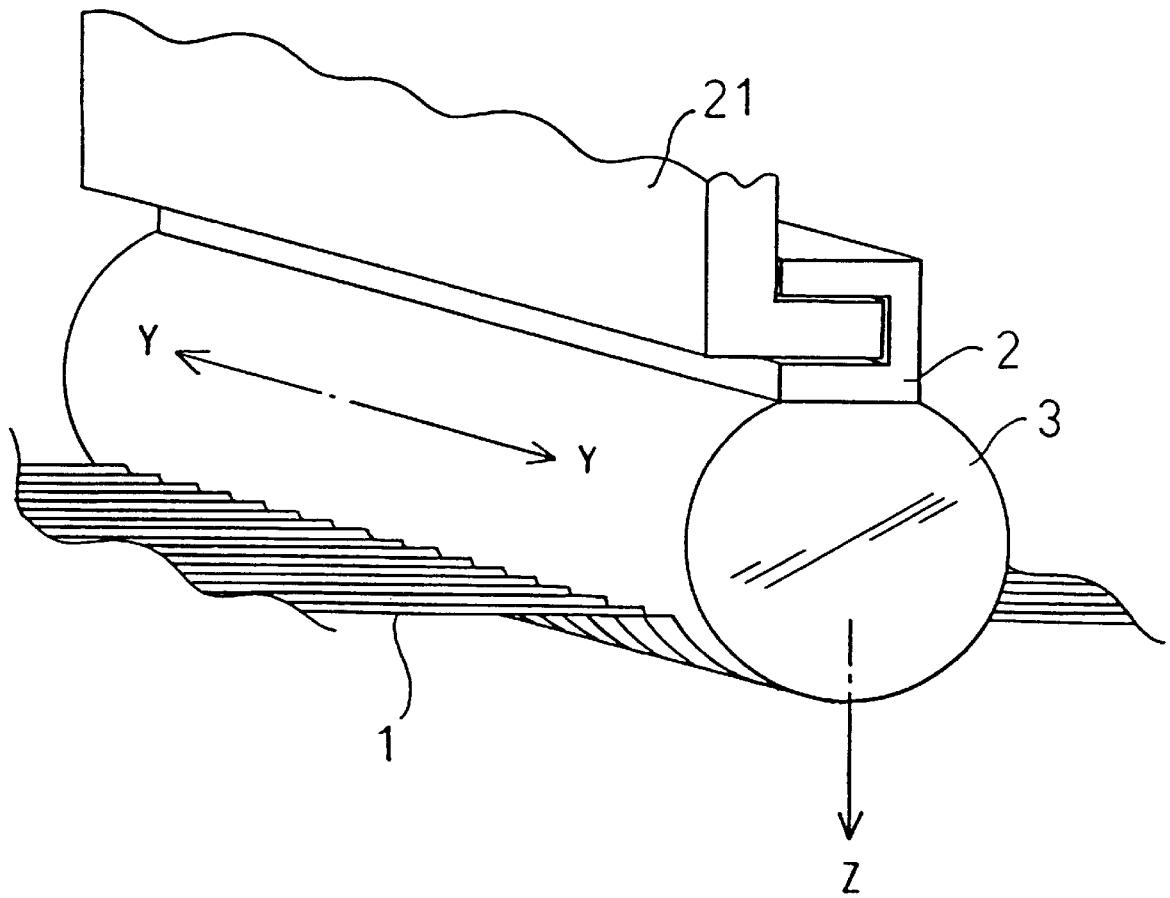
FIG. 1 is a partial perspective view showing the cutting operation according to this invention.
Figure 2:
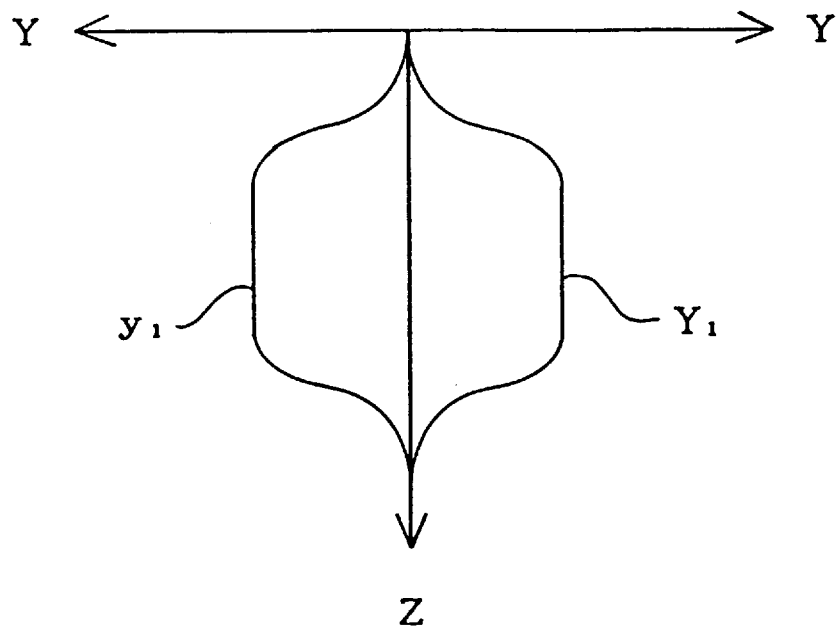
FIG. 2 is a graph showing the displacement along the longitudinal axis of the semiconductor ingot during the cutting operation of a First Embodiment according to this invention.
Figure 3:
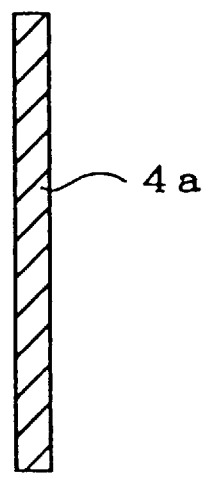
FIG. 3 is a side cross-sectional view of a wafer obtained by the cutting operation of the First Embodiment according to this invention.

FIG. 1 is a partial perspective view showing the cutting operation according to this invention. FIG. 2 is a graph showing the displacement along the longitudinal axis of the semiconductor ingot during the cutting operation of the First Embodiment according to this invention. FIG. 3 is a side cross-sectional view of a wafer obtained by the cutting operation of the First Embodiment according to this invention.

As shown in FIG. 6, in the cutting device utilizing wire saws 1 to cut a semiconductor ingot 3, a workpiece holding plate 21 (see FIG. 1) is disposed in such a way that it can move along the longitudinal axis Y of the semiconductor ingot 3 fixed with a work 2 and the displacement along the longitudinal axis Y is made to change in response to the variation along the descending axis Z of the semiconductor ingot 3.

In the cutting operation utilizing wire saws, the warp tendency of a wafer is predictable, therefore the warp values of wafers can be analyzed in advance by a surface inspection device to obtain a curve of warp values $y_1$. The warp values $y_1$ are inputted into a displacement control device (not shown) which controls the displacement of the workpiece holding plate 21 along the longitudinal axis Y. The displacement control device sends the displacement value $Y_1$ to workpiece holding plate 21 in response to the change of value along the descending axis Z of the semiconductor ingot 3.

Therefore, in the above embodiment, the warp values $y_1$ obtained in advance can be completely canceled out by the displacements $Y_1$, and wafers 4a (shown in FIG. 3) with flat cut-out surfaces can be obtained according to the above embodiment.

SECOND EMBODIMENT

Figure 4:
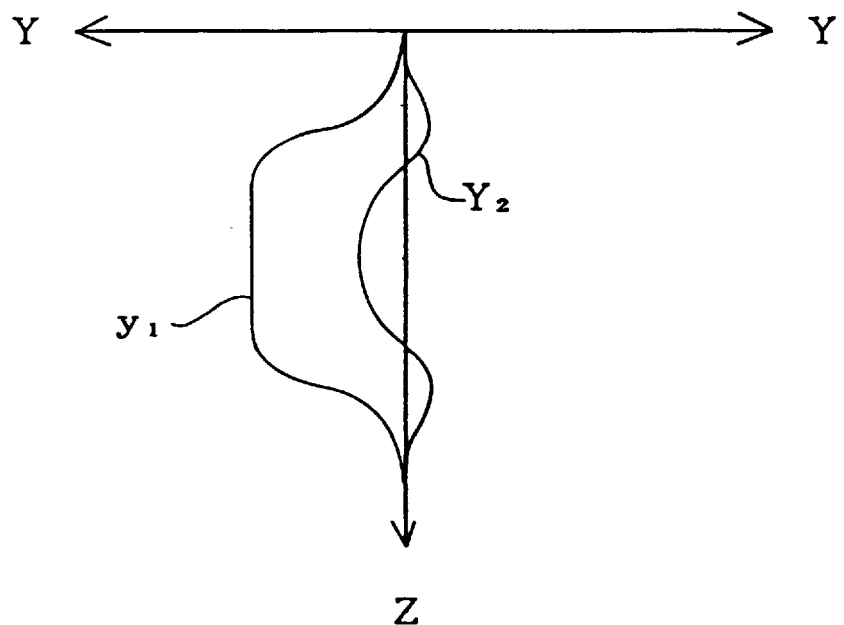
FIG. 4 is a graph showing the displacement along the longitudinal axis of the semiconductor ingot during the cutting operation of a Second Embodiment according to this invention.
Figure 5:
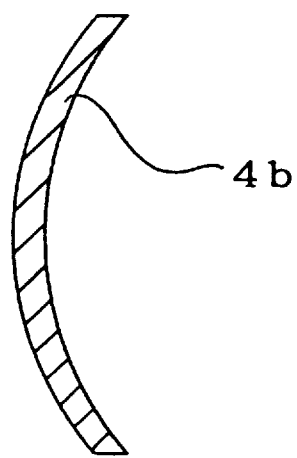
FIG. 5 is a side cross-sectional view of a wafer obtained by the cutting operation of the Second Embodiment according to this invention.

FIG. 4 is a graph showing the displacement along the longitudinal axis of the semiconductor ingot during the cutting operation of the Second Embodiment according to this invention. FIG. 5 is a side cross-sectional view of a wafer obtained by the cutting operation of Second Embodiment according to this invention.

In the First Embodiment, the warp values of wafers are canceled out by displacements of semiconductor ingot to acquire flat wafers. However, in this embodiment, the displacements in predetermined patterns are imposed on the warp values to acquire wafers with intended curved shapes.

In other words, as shown in FIG. 4, the central portion of the curve of the warp values $y_1$ obtained in advance is almost flat. By imposing displacements $Y_2$ which are obtained by deducting the warp values $y_1$ from those of a uniformly curved surface, wafer 4b as shown in FIG. 5 with uniformly curved surface can be obtained by wire-saw cutting. Comparing with conventional cutting operations utilizing I.D.Saw, wire-saw cutting allows sliced wafers to have fewer blotches of roughness and thickness on their cut-out surfaces. Therefore, the margin to be removed in the steps of lapping or plane grinding after cutting operation can be greatly reduced. Furthermore, margin to be removed in the succeeding steps of etching or polishing can also be reduced, accordingly contours of wafers obtained by the cutting method according to this invention will not be spoiled in succeeding processes.

The features of this invention have been described as above, one benefit of this invention is that the cut-out surface shape of wafers can be easily controlled by utilizing a wire-saw cutting device. Moreover, during operation, only displacement of the workpiece holding plate needs to be controlled, therefore the cutting device does not require any complicated structure.

Another benefit is that the shape of wafers obtained according to this invention can be greatly utilized in the succeeding working steps, thus semiconductor wafers of high quality can be produced.

What is claimed is:

1. A method of cutting a semiconductor ingot into sliced wafers by use of wire saws, comprising the steps of:

mounting the semiconductor ingot at a cutting position so as to be movable along a longitudinal axis of the semiconductor ingot;

detecting warp values of wafers to be cut from the semiconductor ingot before cutting;

determining displacement values corresponding to said warp values for obtaining a predetermined shape for said sliced wafers;

and cutting the semiconductor ingot into sliced wafers while controlling a displacement of the semiconductor ingot along the ingot's longitudinal axis in accordance with said determined displacement values.

2. The method as claimed in claim 1, further comprising the steps of:

controlling the displacement of the semiconductor ingot along the longitudinal axis of the semiconductor ingot so as to cancel out the warp values of the wafers to be cut.

3. The method as claimed in claim 1, further comprising the steps of:

controlling the displacement of the semiconductor ingot along the longitudinal axis of the semiconductor ingot so as to add the warp values to produce wafers with uniformly curved cross sections.

4. An apparatus for cutting a semiconductor ingot into sliced wafers by use of wire saws, comprising:

wire saws for cutting said ingot;

a fixing plate for mounting the semiconductor ingot at a cutting position so as to be movable along a longitudinal axis of the semiconductor ingot;

a detector for detecting curve warp values of wafers to be cut from the semiconductor ingot before cutting; and means for controlling a disposing state of the semiconductor ingot to be cut on the fixing plate so as to control a displacement of the semiconductor ingot along the longitudinal axis of the semiconductor ingot in response to the detected warp values for obtaining a predetermined shape for said sliced wafers.

5. The apparatus for cutting a semiconductor ingot as claimed in claim 4, wherein the means for controlling the displacement of the semiconductor ingot along the longitudinal axis of the semiconductor ingot cancels out the warp values of the wafers to be cut.

6. The apparatus for cutting a semiconductor ingot as claimed in claim 4, wherein the means for controlling the displacement of the semiconductor ingot along the longitudinal axis of the semiconductor ingot adds the warp values to produce wafers with uniformly curved cross sections.

* * * * *